United States Patent [19]

Masumoto et al.

[11] Patent Number: 4,864,436
[45] Date of Patent: Sep. 5, 1989

[54] ROTARY HEAD DIGITAL AUDIO RECORDING/REPRODUCING APPARATUS

[75] Inventors: Yutaka Masumoto; Tomoyasu Yamada; Seiichi Yokosawa, all of Saitama, Japan

[73] Assignee: Pioneer Electronic Corporation, Tokyo, Japan

[21] Appl. No.: 99,460

[22] Filed: Sep. 21, 1987

[30] Foreign Application Priority Data

Sep. 20, 1986 [JP] Japan .................. 61-222686

[51] Int. Cl.⁴ ........................... G11B 5/03
[52] U.S. Cl. .................................. 360/66
[58] Field of Search ............... 360/66, 64, 102

[56] References Cited

U.S. PATENT DOCUMENTS

| | | |
|---|---|---|
| 2,526,358 | 10/1950 | Howell ........................... 360/66 |
| 3,435,442 | 3/1969 | Ma et al. ........................ 360/102 |
| 3,838,446 | 9/1974 | Otsuka et al. .................. 360/66 |
| 3,908,894 | 8/1975 | Aziz ............................... 360/66 |
| 3,961,369 | 6/1976 | Baumann et al. .............. 360/102 |
| 4,163,267 | 7/1979 | DeMoss .......................... 360/102 |
| 4,527,202 | 7/1985 | Ohra .............................. 360/66 |
| 4,651,239 | 3/1987 | Omori et al. ................... 360/66 |

*Primary Examiner*—Vincent P. Canney
*Attorney, Agent, or Firm*—Sughrue, Mion, Zinn, Macpeak & Seas

[57] ABSTRACT

In a digital audio recording/reproducing apparatus of the rotary head type, erasure of signals in previously recorded tracks, which are used to control the operation of a tracking servomotor, is enhanced by the provision of a magnetic field generator prior to the point where overwriting occurs. As a result, errors in the tracking error signal arising due to unerased remnants of the previously recorded signals are eliminated.

20 Claims, 5 Drawing Sheets

RECORD / REPRODUCE

FIG. 15

ROTARY HEAD DIGITAL AUDIO RECORDING/REPRODUCING APPARATUS

BACKGROUND OF THE INVENTION

The present invention generally relates to a recording/reproducing apparatus of the rotary head type. More particularly, the invention relates to a rotary head recording/reproducing apparatus in which an audio signal is converted into a PCM (pulse code modulation) signal, and the PCM signal is recorded in the form of one inclined track for every predefined unit of time on a recording medium by means of a rotary head.

To record and reproduce an audio signal in the form of parallel inclined tracks on a magnetic tape by means of a rotary head of the helical scanning type, a so-called R-DAT (rotary-head digital audio tape recorder) has been proposed in which the input audio signal is converted into a PCM signal for recording/reproduction.

Figure 1A:
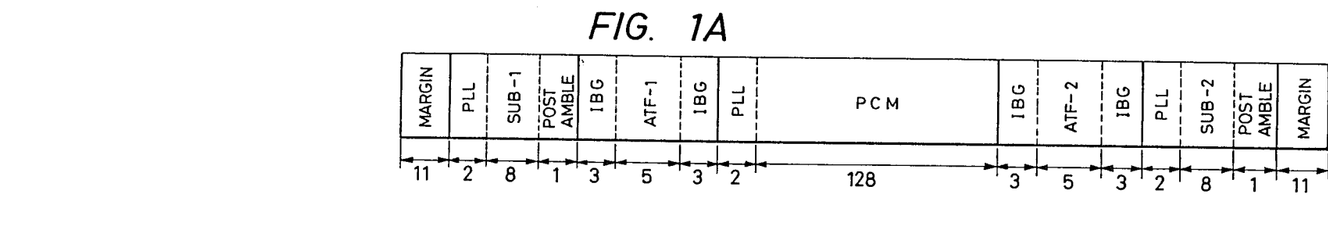
FIGS. 1A and 1B are diagrams for explaining the track format and the block format of an R-DAT.
Figure 1B:
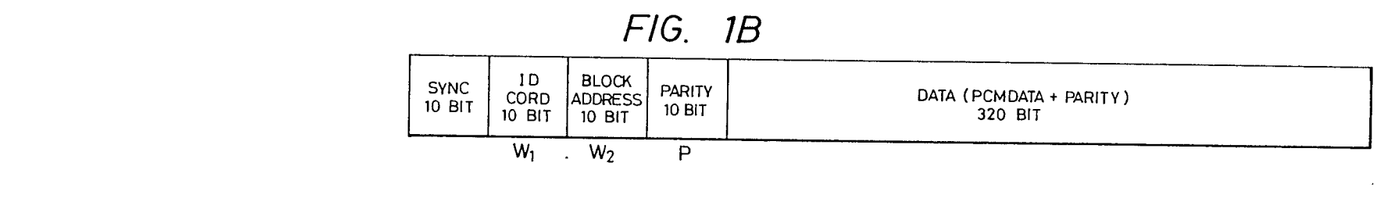

A track in which an audio signal is recorded with an R-DAT has a pattern as shown in FIG. 1A, in which each of the MARGIN, PLL, and POSTAMBLE regions has a frequency of $\frac{1}{2} f_M$ ($f_M = 9.4$ MHz) and an IBG region has a frequency of $1/6 f_M$. Each of the SUB and PCM regions is constituted by a block as shown in FIG. 1B. A SYNC region is constituted by 10 bits (nine bits being fixed), and the remaining regions have various patterns depending on locations and audio signals. Those blocks are repeated eight times and 128 times in the case of the SUB region and the PCM region, respectively. In the diagram of FIG. 1A, the numerical values represent the number of blocks constituting each of the regions.

An ATF-1 region (ATF: automatic track finding) disposed between the SUB-1 region and the PCM reigon and an ATF-2 region disposed between the PCM region and the SUB-2 region are provided for purposes of tracking control so that, during reproduction, the rotary head can accurately scan a recorded track on the basis of the output of the rotary head alone. Thus, there is no need to provide a special tracking control head.

That is, the ATF regions are used in controlling the tracking of the rotary heads during reproduction in the case where a PCM signal is time-compressed and recorded in the form of parallel inclined tracks with no guard band. Tracking pilot signals are recorded at the initiation and termination positions of each of the tracks in recording regions formed independently of the recording region in which the PCM signal is recorded. During reproduction, the recording track is scanned by a rotary head having a scanning width larger than that of the recorded track, and the tracking of the rotary head is controlled in response to the reproduced outputs of the pilot signals from the two side tracks adjacent to the track being scanned.

Figure 2:
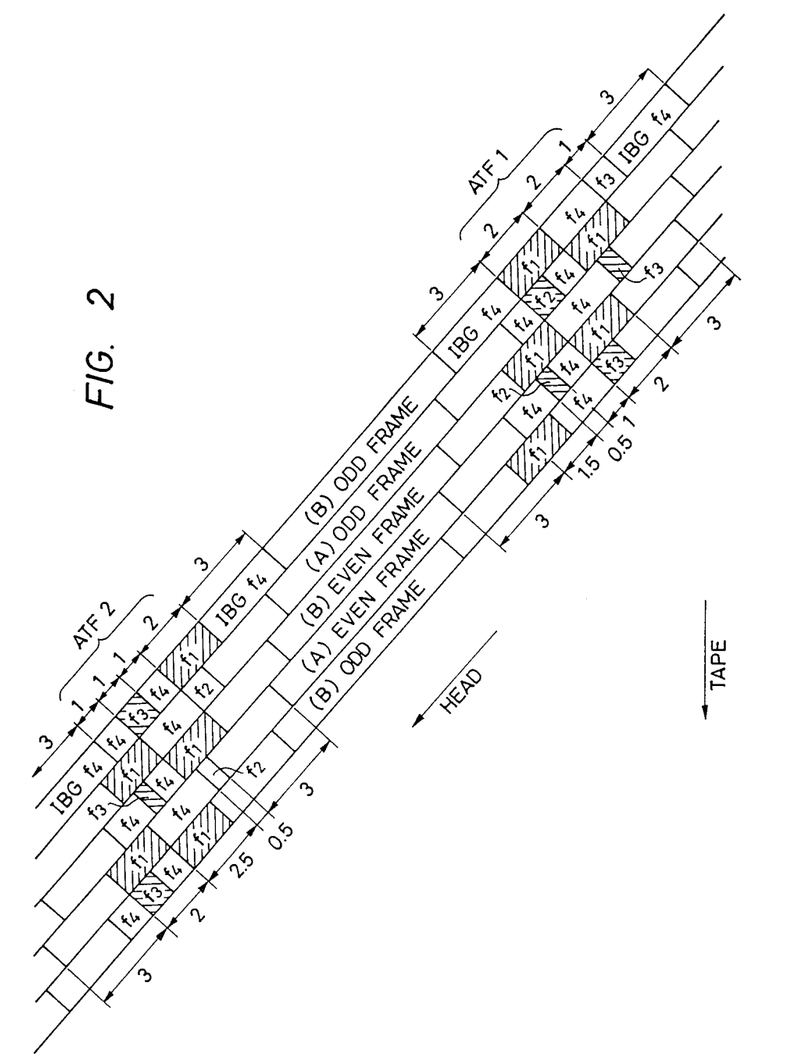
FIG. 2 is a diagram for explaining the ATF track pattern of the R-DAT.

FIG. 2 shows the track patterns of the pilot signals recorded in those ATF regions. A description will be given as to the illustrated patterns in the case where the scanning head rotary drum has a diameter of 30 mm, a winding angle of 90 degrees, and a rotational speed of 2000 rpm.

In each of the ATF-1 and ATF-2 regions respectively disposed in the initiation and termination positions of each of the tracks, a signal $f_1$ of a low frequency and having a small azimuth loss is recorded as a pilot signal for tracking control, and the signal f1 is utilized during reproduction to detect the levels of crosstalk components from both the adjacent tracks. The difference in level between the crosstalk components is used as the tracking error signal. For the foregoing pilot signal $f_1$, a low frequency signal of $1/72 f_M$ (130 KHz) may be used.

Further, a synchronizing signal is recorded in each of the ATF-1 region and the ATF-2 region so as to discriminate the position where the pilot signal $f_1$ is recorded. For the synchronizing signal, a signal of a frequency having an azimuth effect and of a pattern different from that of the PCM signal is selected because the center track (the track being scanned) cannot be discriminated from the two adjacent tracks when crosstalk is generated from the adjacent tracks. Assuming that a head A corresponds to plus azimuth and a head B corresponds to minus azimuth, the synchronizing signals are made to be different in frequency from each other so as to discriminate the head A and the head B from each other. For this purpose, a first synchronizing signal $f_2$ of a frequency of $1/18 f_M$ ($= 522$ KHz) corresponding to the head A and a second synchronizing signal $f_3$ of a frequency of $1/12 f_M$ ($= 784$ KHz) corresponding to the head B are recorded in predetermined positions.

In the R-DAT, no erase head is used, and signal rewriting is performed through an overwriting operation in which the new signal is written over the old signal. To this end, erase signals $f_4$ each having a frequency of $1/6 f_M$ ($= 1.56$ MHz) are recorded in predetermined positions so as to erase the previously recorded pilot signal $f_1$, first synchronizing signal $f_2$, and second synchronizing signal $f_3$.

The positions of all the pilot signals recorded in the respective ATF regions on the center track and its adjacent tracks are made different from each other, and the levels of the pilot signals in the center track and the adjacent tracks are made to differ in time so that three types of levels of the pilot signals can be sampled.

Each of the ATF-1 region and the ATF-2 region is constituted by five blocks, and the pilot signal $f_1$ is recorded in two of the five blocks. The synchronizing signal $f_2$ or $f_3$ is recorded so as to occupy either one block or one-half block from the center of the position where one of the adjacent tracks is recorded. The pilot signal $f_1$ on the other adjacent track is recorded such that the center of the pilot signal $f_1$ is located at a position two blocks behind the head of the synchronizing signal recorded on the center track. The synhronizing signal of one block and the synchronizing signal of one-half block are assigned to an odd number frame track and an even number frame track, respectively.

As described above, in the ATF region, the frequency of the synchronizing signal corresponding to the head A is different from that of the synchronizing signal corresponding to the head B, and further the recording length of the synchronizing signal recorded on the odd number frame track is different from that of the synchronizing signal recorded on the even number frame track. Therefore, the ATF regions provided on four successive tracks are made entirely different in arrangement from each other so that four successive tracks can be discriminated from each other. Thus, ATF pattern described above is repeated every four tracks; that is, the ATF pattern is of the four-track completion type.

Figure 3A:
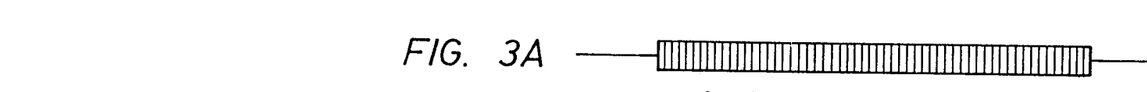
FIGS. 3A–3C are diagrams for explaining the principles of tracking based on the ATF track pattern.
Figure 3B:
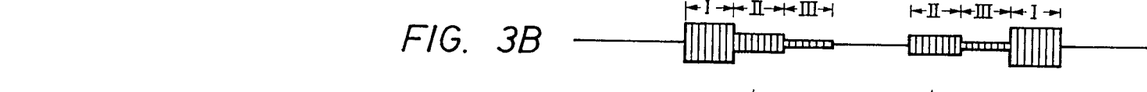
Figure 3C:
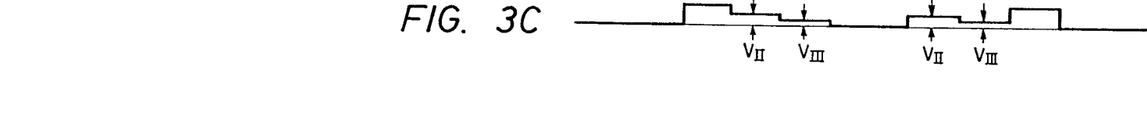

When a magnetic tape carrying an audio signal recorded in the format shown in FIG. 1A is reproduced by a rotary head, an RF signal as shown in FIGS. 3A-3C is obtained from the rotary head. In the case where the RF signal is obtained, for example, by the reproduction of an odd number frame track (A) shown in FIG. 2, the RF signal is passed through a BPF (bandpass filter) of 130 KHz to thereby obtain a pilot signal $f_1$ as shown in FIG. 3B.

In FIG. 3B, the section I is obtained from the pilot signal of the center track, and sections II and III are formed from crosstalk of the pilot signals of an odd number frame track (B) and an even number frame track (B), respectively. If the center track is accurately scanned by the rotary head, the envelope levels of the sections II and III, that is, the amplitudes $V_{II}$ and $V_{III}$ indicated in FIG. 3C, will be equal to each other. However, if there is a track displacement, the amplitudes $V_{II}$ and $V_{III}$ will be different from each other, and the amplitude and direction of displacement of the rotary head relative to the center track can be detected by the amplitude and polarity of the difference between the amplitudes $V_{II}$ and $V_{III}$. Therefore, the rotary head can be made to accurately follow the center track if the capstan servo controlling the speed of the tape is driven in accordance with the difference between the amplitudes $V_{II}$ and $V_{III}$ so as to finely adjust the tape speed.

In order to carry out the foregoing operation, it is necessary to accurately detect the synchronizing signals recorded in the predetermined positions so as to sample the levels $V_{II}$ and $V_{III}$. However, as described above, the R-DAT is provided with no erase head, and second, third, etc., recording operations are carried out by overwriting. Accordingly, in the conventional R-DAT, there has been the possibility that the synchronizing signals cannot be accurately detected in sampling the levels $V_{II}$ and $V_{III}$ so that a proper error signal cannot be generated.

That is, recording may be made within ±2 blocks from the center of the PCM region, and the pilot signal $f_1$ (=130 KHz) recorded at a level which is slightly lower than those of other signals. This is because a signal of a lower frequency is recorded physically more deeply into the tape. However, the previously recorded pilot signal $f_1$ must be erased by a higher frequency erase signal. If the level of the pilot signal $f_1$ is lowered, there is thus the possibility that when the pilot signal $f_1$ is newly recorded over a previously recorded synchronizing signal $f_2$ or $f_3$, the previously recorded synchronizing signal cannot be entirely erased.

For example, in the case where the succeeding (new) recording is displaced backwardly, the synchronizing signal remaining after erasure will be advanced with respect to the newly recorded synchronizing signal. In a typical example of such a case, the pilot signal $f_1$ is displaced backwardly within 1–2 blocks so that a part or all of the previously recorded synchronizing signal $f_2$ or $f_3$ remains after erasure at a region where the pilot signal $f_1$ is to be recorded, namely, in the odd number frame (A) or in the even number frame (A) in the case of the ATF-1 region, or in the odd number frame (B) or in the even number frame (B) in the case of the ATF-2 region.

When such displacement occurs, the level of the frequency component of the pilot signal of the reproduced RF signal at that time is sampled which corresponds to the previously recorded synchronizing signal. The level of this pilot signal should be the level of crosstalk of the sampling signal of one of the adjacent tracks. However, the foregoing sampled frequency component is the pilot signal on the center track, and hence the level obtained by sampling has an exceedingly large value. Thereafter, the frequency component of the pilot signal in the reproduced RF signal after two blocks is sampled, the difference in level between this sampled value and the sampled value two blocks earlier is obtained, and the capstan servo is controlled in response to the level difference, which is taken as indicative of the amount of the track displacement. The previously sampled value, however, is not the crosstalk level of the adjacent track, but the level of the center track, and therefore, as a level difference, an extremely large value greatly different from that accurately indicative of the actual track displacement is obtained. As a result, the capstan servo cannot operate properly.

Although usually no problem arises in the case where a previously recorded pilot signal $f_1$ is erased by a new pilot signal $f_1$ using the same apparatus, it is a matter of course that there are variations in recording levels among different apparatuses, especially among apparatuses produced by different makers. Hence there will unavoidably occur such a problem that, for example, a signal is recorded deeply in recording level in an apparatus A while shallowly in another apparatus B. In such a case, there is still no problem if the overwriting operation on a tape recorded by the apparatus B is carried out with the apparatus A, but the problem will obviously occur when a previously recorded pilot signal $f_1$ cannot be erased by a new pilot signal when the overwriting operation on a tape recorded by the apparatus A is carried out with the apparatus B. In this case, the previously recorded pilot signal and the newly overwritten pilot signal interfere with each other such that they are added to or subtracted from each other. Therefore, even when a synchronizing signal is accurately detected, there occurs a problem that the amount of track displacement cannot be accurately detected because of the interference between the pilot signals $f_1$. In the worst case, the center of the DCM region will not be displaced with the same azimuth.

In the R-DAT, there have been the foregoing various problems because no erase head is provided and erasure is performed only by overwriting operations. In order to solve the foregoing problems, an erase head may be provided which contacts the tape and applies a magnetic field to the tape to thereby erase the previously recorded signals. Otherwise a "flying" erase head may be used, similarly to the conventional analog tape recorder.

In the former case of using an erase head, however, it is necessary to separate the erase head from the tape during reproduction. Therefore, the tape path in the reproducing mode is different from that in the recording mode, making it more likely that tape running problems will occur. Further, in the latter case of using a flying erase head, although the above-mentioned problem is eliminated, since it is necessary to attach the erase head to a rotary drum having a very small diameter of not larger than 30 mm, there occur manufacturing problems and higher costs are inevitable.

SUMMARY OF THE INVENTION

It is therefore an object of the present invention to solve the foregoing problems.

It is another object of the present invention to provide a digital audio recording/reproducing apparatus of the rotary head type in which problems such as misoperation due to the presence after overwriting of the residue of previously recorded signals are solved by simple and inexpensive means and without adversely affecting the running of the tape.

In accordance with the above and other objects, a digital audio recording/reproducing apparatus of the present invention is provided with magnetic field generation means which causes a magnetic field to act on the recording medium at the feeding side of the rotary head. The field generation means does not contact the recording medium during signal recording operations. As a result, the level of previously recorded signals is lowered by the magnetic field generated by the magnetic field generation means prior to the overwriting operation. Therefore, the foregoing problems due to overwriting are overcome with no adverse effect on the running of the tape and without the need for providing any complicated and expensive structure. With the invention, misoperation of the tracking servomotor is prevented while the rate of digital signal reproduction error is reduced.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENTS

A preferred embodiment of a digital audio recording/reproducing apparatus of the rotary head type constructed according to the present invention will be described hereunder with reference to the accompanying drawings.

Figure 4:
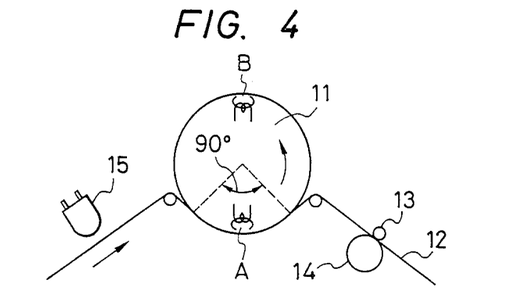
FIG. 4 is a plan view showing an embodiment of the present invention.

FIG. 4 is a plan view showing an embodiment of the apparatus of the present invention. In this drawing, a rotary drum 11 provided with recording/reproducing rotary heads A and B is driven by a drum motor (not shown) to rotate in the direction of an arrow during recording/reproducing operations. A tape 12 pulled out of a cassette (not shown) is wound around the rotary drum 11 through 90 degrees. The tape 12 is taken up by a reel provided in the cassette and rotated by reel motor (not shown) so as to make the tape run in the direction of an arrow. The tape 12 is held between a pinch roller 14 and a capstan 13 rotated by a capstan motor (not shown) so as to run the tape at a fixed speed.

Figure 5:
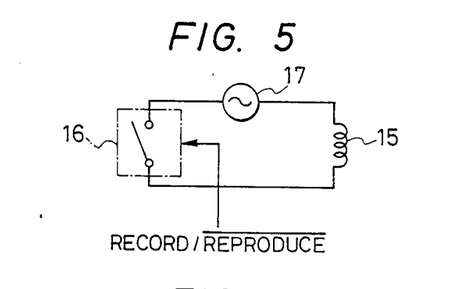
FIG. 5 is a circuit diagram showing a circuit for driving the magnetic head of FIG. 1.
Figure 6:
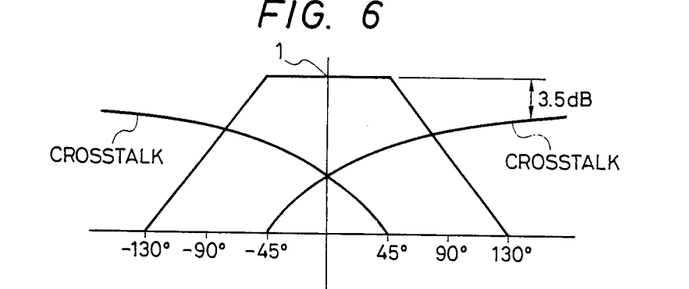
FIGS. 6 and 7 are diagrams for explaining the reproducing characteristics of the pilot signal in the case where recording is carried out only once.
Figure 7:
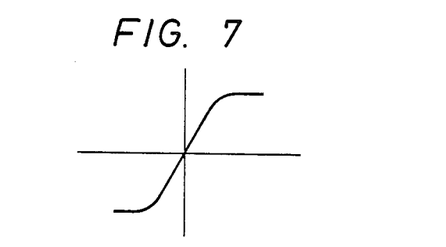

A magnetic head 15 is disposed at the tape feeding side of the rotary drum 11 in opposition to the tape 12 and positioned out of contact with the tape 12. The magnetic head 15 is provided as a magnetic field generator for producing a magnetic field which acts on the tape 12 during recording. As shown in FIG. 5, the magnetic head 15 is arranged to generate a magnetic field when a current is applied from a suitable current source 17 to the magnetic head 15 through a switch 16 which is turned on in response to a recording/reproducing signal which is high during recording. The strength of the magnetic field generated by the magnetic head 15 should be selected to suitably lower the level of recorded signals on the tape 12 when it was previously recorded Consideration will now be given to the reproduced level of the pilot signal $f_1$ recorded in the ATF region of the tape 12. FIG. 6 shows a comparison of the level of the center tracks, which is normalized to "1" (unity), with the respective levels of crosstalk of tracks adjacent to the center track in the case where no overwriting has been performed on the tape 12, that is, in the case where recording has been made only once on the tape 12. On the other hand, FIG. 7 shows the composite reproducing characteristics of a single S-shaped curve obtained by combining the level of the center track and the respective levels of the adjacent tracks. In FIG. 6, the level difference of 3.5 dB between the center track and the crosstalk is due to an azimuth loss.

Figures 8, 9:
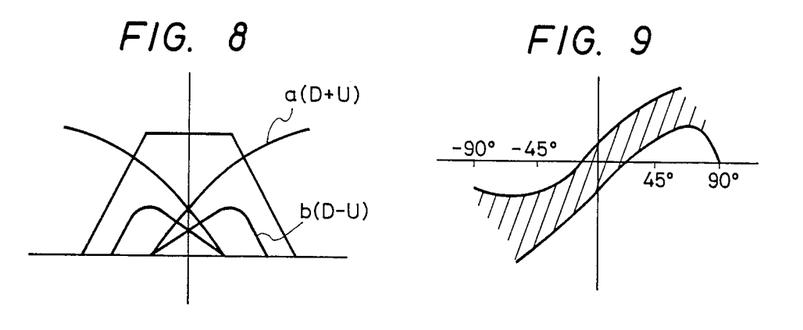
FIGS. 8 and 9 are diagrams for explaining the problems due to overwriting.

In the case where overwriting has been performed on the tape 12, the pilot signal in the ATF region can be erased by only about 3–6 dB. That is, the level ratio D/U of a desired signal (D) formed by a successful recording to an undesired residue signal (U) left after erasure of a previous recording is 3–6 dB. Thus, in the case where D/U=6 dB, the desired signal D and the undesired U may interfere with each other and thereby increase/decrease the recording level so that the output level ratio of the center track to the crosstalk shown in FIG. 6 changes as shown in FIG. 8. In FIG. 8, a represents the level increased by the interference and b represents the level decreased by the interference. The crosstalk level scatters between the levels a and b.

When such scattering is present, the composite reproducing characteristics obtained by combining these levels with each other change such that the S-shaped curve of FIG. 6 is expanded to the area of a hatched range as shown in FIG. 9. Further, the S-shaped curve of FIG. 9 has no linear portion in the range of ±90 degrees and has portions in which the gradient of the curve is inverted. This phenomenon adversely affects the capstan servo, which performs tracking control on the basis of a level difference in the crosstalk components of the pilot signal. In the worst case, it becomes impossible to carry out tracking control at all. Further, the D/U of the pilot signal is often actually smaller than 6 dB, sometimes being as low as 3–4 dB. In such a case, the range of the S-shaped curve is further expanded and the linear region is reduced. Therefore, the problem becomes more serious.

Figure 10:
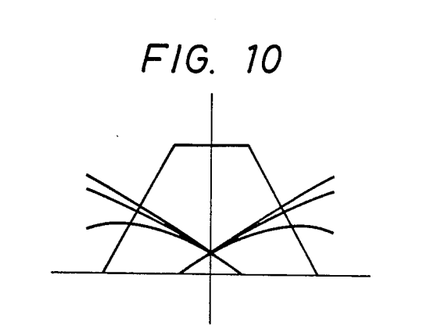
FIGS. 10 and 11 are diagrams for explaining the effects of the present invention.
Figure 11:
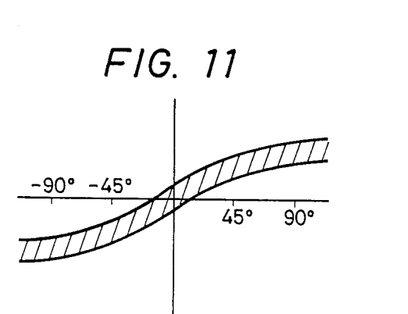

If the ratio D/U can be maintained at about 12 dB, however, the scattering of crosstalk levels due to interference is made small, as shown in FIG. 10, so that the S-shaped curve of the composite reproducing characteristics has a linear portion in the range of ±90 degrees, as shown in FIG. 11. The composite reproducing characteristics of the S-shaped curve shown in FIG. 11 yield little adverse effect on the capstan servo.

The magnetic head 15 will produce the desired result if it generates a magnetic field acting on the tape 12 sufficient to compensate for the erasure of the pilot signal in the ATF region, which can be erased only by about 3-6 dB by overwriting. As seen from the foregoing explanation, the magnetic field will be sufficient if it can attenuate the previously recorded signals by about 6-10 dB. The ratio D/U thus can be made to be about 9-16 dB due to the signal attenuation produced by the magnetic head 15, in addition to the signal attenuation produced by the overwriting operation, so that erasure can be performed to a level which is insignificant for the servo system.

Although the foregoing description relates to the low-frequency pilot signal, which is the most difficult signal to erase, the synchronizing signal and the PCM data are similarly attenuated by the magnetic field generated by the magnetic head 15 prior to the overwriting operation so that all problems due to residue signals are solved. It is a matter of course that the error rate in the PCM data is improved.

Figure 12:
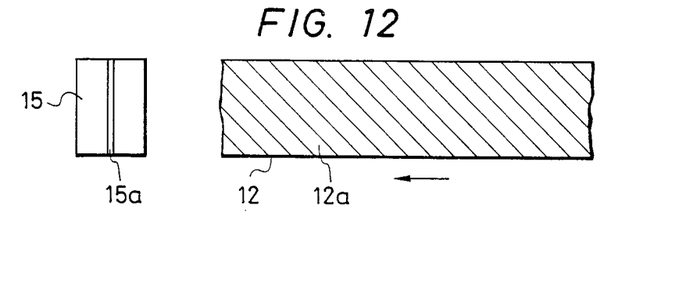
FIGS. 12 and 13 are diagrams for explaining an example of the disposition of the magnetic head relative to a tape.
Figure 13:
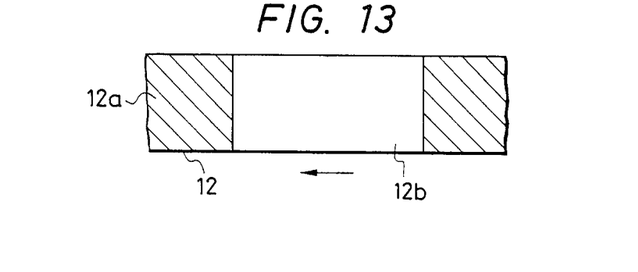

As shown in FIG. 12, in the case where a magnetic head 15 having a vertical magnetic gap 15a is employed and the magnetic head 15 is arranged so as to make the direction of the magnetic gap 15a perpendicular to the direction of movement of the tape 12 to thereby attenuate recording on the tape 12 in the state where the magnetic head 15 is not in contact with the tape 12, the previous recording on a track 12a is not completely attenuated but partially remains at the initiation and termination of an attenuation region 12b, as shown in FIG. 13. In the track 12, the part in which the recording is not attenuated has a length of about 3-4 seconds in time, and the servo system may not operate properly in this part.

Figure 14:
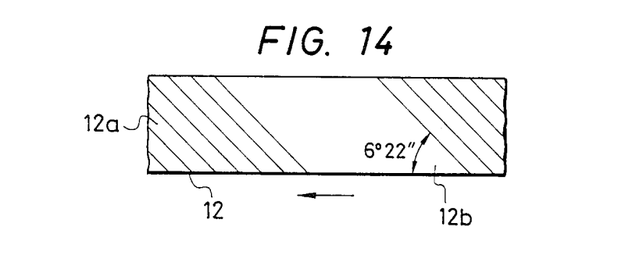
FIGS. 14 and 15 are diagrams for explaining another example of the disposition of the magnetic head relative to tape.
Figure 15:
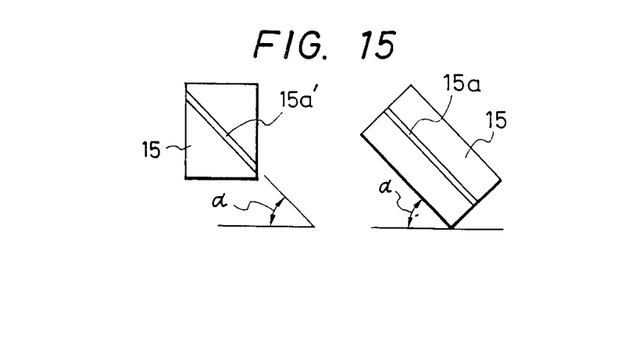

Therefore, it is preferable to use a magnetic head 15 having an inclined magnetic gap 15a' having an inclination angle α corresponding to the inclination of 6°22" of the track 12a on the tape 12, as shown in FIG. 14, or to use a magnetic head 15 having a vertical magnetic gap 15a and arranged at an inclination angle α, as shown in FIG. 15, so that the initiation and termination of the recording attenuation region 12b occur following the track 12a, as shown in FIG. 14, making it possible to attenuate recording over the complete track without portions remaining where recording has not been attenuated.

Further, although a magnetic head is used as the magnetic generator in the illustrated embodiment, the same effects can be obtained also in the case where an electromagnet or a permanent magnet is used in place of the magnetic head. In the case where a permanent magnet is used, however, it is necessary that the magnet be movable by a suitable driving member so that in the reproducing mode the magnet is separated from the tape to such an extent that the recording on the tape is not influenced by the magnetic field of the magnet, while in the recording mode the magnet is moved close to the tape within a range where the magnet does not come into contact with the tape but where the required signal attenuation can be performed.

As described above, according to the present invention, the digital audio recording/reproducing apparatus of the rotary head type according to the present invention is provided with a magnetic field generator which causes a magnetic field to act on a recording medium at the feeding side of the recording medium toward a rotary head. The field generator does not contact the recording medium during signal recording operations. Accordingly, the level of previous recording is lowered by the magnetic field generated by the magnetic field generator prior to the overwriting operation. As a result, problems due to overwriting are solved without adversely affecting the running of the tape and without the need for a complicated or expensive arrangement. With the invention, the tracking servomotor is made to operate correctly at all times, and the rate of digital signal reproduction error reduced.

What is claimed is:

1. In a digital audio recording/reproducing apparatus of the rotary head type having at least two rotary heads arranged so that a digital signal, a pilot signal composed of a low frequency signal of a small azimuth loss, and a tracking signal are recorded by said rotary heads on each of a plurality of inclined tracks on a recording medium in a predetermined format including recording regions formed on the track separately in the longitudinal direction of the track for recording said digital, pilot, and tracking signals, respectively, said tracking signal having a synchronizing signal representing a position of a second pilot signal recorded on a track precedently adjacent to the track on which said first-mentioned pilot signal is recorded, and wherein said signals recorded on the recording medium are reproduced by said rotary heads, the improvement comprising magnetic field generation means for producing a magnetic field acting on said recording medium at a feeding side of said recording medium toward said rotary heads for enhancing erasure of said recording medium, said magnetic field generation means being out of contact with said recording medium.

2. The digital audio recording/reproducing apparatus of claim 1, wherein said magnetic field generating means comprises a magnetic head.

3. The digital audio recording/reproducing apparatus of claim 2, wherein said magnetic head has a vertical magnetic gap extending in a widthwise direction of said tape at an angle which is substantially perpendicular to a direction of movement of said tape.

4. The digital audio recording/reproducing apparatus of claim 2, wherein said magnetic head has a magnetic gap inclined at an angle substantially equal to an angle of inclination of said inclined tracks.

5. The digital audio recording/reproducing apparatus of claim 1, wherein said magnetic field generating means comprises an electromagnet.

6. The digital audio recording/reproducing apparatus of claim 1, wherein said magnetic field generating means comprises a permanent magnet.

7. A digital recording/reproducing apparatus comprising:
 a rotary head for recording signals which include low frequency control signals on inclined tracks of a recording medium; and
 means which are out of contact with said recording medium for generating a magnetic field which acts on said recording medium to enhance erasure of signals previously recorded by said rotary head before the recording medium is fed past said rotary head.

8. The digital audio recording/reproducing apparatus of claim 7, wherein said magnetic field generating means comprises a magnetic head.

9. The digital audio recording/reproducing apparatus of claim 8, wherein said magnetic head has a vertical magnetic gap extending in a widthwise direction of said tape at an angle which is substantially perpendicular to a direction of movement of said tape.

10. The digital audio recording/reproducing apparatus of claim 8, wherein said magnetic head has a magnetic gap inclined at an angle substantially equal to an angle of inclination of said inclined tracks.

11. The digital audio recording/reproducing apparatus of claim 7, wherein said magnetic field generating means comprises an electromagnet.

12. The digital audio recording/reproducing apparatus of claim 7, wherein said magnetic field generating means comprises a permanent magnet.

13. The digital audio recording/reproducing apparatus of claim 1, wherein a level ratio of a desired signal formed by a successful recording on said recording medium to an undesired residue signal left after erasure of a previous recording on said recording medium is in the range of 9 to 16 decibels.

14. The digital audio recording/reproducing apparatus of claim 13, wherein said level ratio corresponds to said pilot signals.

15. The digital audio recording/reproducing apparatus of claim 1, wherein said magnetic field attenuates signals previously recorded on said recording medium in the range of 6 to 10 decibels.

16. The digital audio recording/reproducing apparatus of claim 15, wherein said attenuated signals correspond to said pilot signals.

17. The digital audio recording/reproducing apparatus of claim 7, wherein a level ratio of a desired signal formed by a successful recording on said recording medium to an undesired residue signal left after erasure of a previous recording on said recording medium is in the range of 9 to 16 decibels.

18. The digital audio recording/reproducing apparatus of claim 17, wherein said level ratio corresponds to low frequency pilot signals recorded on said recording medium.

19. The digital audio recording/reproducing apparatus of claim 7, wherein said magnetic field attenuates signals previously recorded on said recording medium in the range of 6 to 10 decibels.

20. The digital audio recording/reproducing apparatus of claim 19, wherein said attenuated signals correspond to low frequency pilot signals recorded on said recording medium.

* * * * *